United States Patent
Chen et al.

(10) Patent No.: US 8,432,138 B2
(45) Date of Patent: Apr. 30, 2013

(54) POWER FACTOR CORRECTION CONVERTER AND CONTROL METHOD THEREOF

(75) Inventors: Weubin Chen, Shenzhen (CN); Boning Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 240 days.

(21) Appl. No.: 12/967,954

(22) Filed: Dec. 14, 2010

(65) Prior Publication Data

US 2011/0260700 A1     Oct. 27, 2011

(30) Foreign Application Priority Data

Apr. 22, 2010 (CN) .......................... 2010 1 0155655
Oct. 22, 2010 (CN) .......................... 2010 1 0516343

(51) Int. Cl.
    *G05F 1/70*     (2006.01)
    *H02M 1/42*     (2007.01)

(52) U.S. Cl.
    USPC ........................... 323/207; 363/125; 323/225

(58) Field of Classification Search .................... 363/89, 363/125, 127, 65; 323/205, 207, 222, 225, 323/271, 272
See application file for complete search history.

(56) References Cited

U.S. PATENT DOCUMENTS

| | | | |
|---|---|---|---|
| 4,412,277 A | 10/1983 | Mitchell | |
| 7,518,895 B2 * | 4/2009 | Shekhawat et al. | 363/89 |
| 8,050,069 B2 * | 11/2011 | Karipides et al. | 363/125 |
| 8,125,205 B2 * | 2/2012 | Chandrasekaran et al. | 323/282 |
| 2007/0058402 A1 | 3/2007 | Shekhawat et al. | |
| 2008/0054874 A1 | 3/2008 | Chandrasekaran et al. | |
| 2009/0230929 A1 * | 9/2009 | Sui et al. | 323/207 |
| 2011/0149622 A1 | 6/2011 | Lin | |
| 2011/0260700 A1 | 10/2011 | Chen et al. | |

FOREIGN PATENT DOCUMENTS

| | | |
|---|---|---|
| CN | 101056068 A | 10/2007 |
| CN | 201146458 Y | 11/2008 |
| CN | 101615856 A | 12/2009 |
| CN | 101685969 A | 3/2010 |
| CN | 101841236 A | 9/2010 |
| GB | 2454216 A | 5/2009 |

OTHER PUBLICATIONS

Filed Chinese Patent Application No. 200910159150.6.
Filed European Patent Application No. 0911921 (corresponds to Chinese Patent Application No. 200910159150.6).

(Continued)

*Primary Examiner* — Gary L Laxton
(74) *Attorney, Agent, or Firm* — Brinks Hofer Gilson & Lione

(57) ABSTRACT

A power factor correction converter and a control method thereof are provided includes an interleaving control tube set, an interface to an alternating current power supply, a first inductor, a second inductor, a third inductor, a capacitor, a first bridge arm and a second bridge arm. A bridge arm includes a first switch tube and a second switch tube connected in series; The first bridge arm, the second bridge arm, and the capacitor are connected to each other in parallel; the alternating current power supply and the first inductor are connected in series, and the second inductor and the third inductor are connected in parallel, and then connected to the first inductor in series; the second inductor is connected to the first bridge arm, and the second inductor is connected to the second bridge arm; and the alternating current power supply and the first inductor are connected in series.

20 Claims, 3 Drawing Sheets

OTHER PUBLICATIONS

Office Action issued in corresponding Chinese Patent Application No. 201010516343.5, mailed Jan. 31, 2012.

Firmansyah et al., "A Critical-Conduction-Mode Bridgeless Interleaved Boost Power Factor Correction" PEDS 2009.

Extended European Search Report issued in corresponding European Patent Application No. 10196187.8, mailed Nov. 15, 2011.

Written Opinion of the International Searching Authority issued in corresponding PCT Patent Application No. PCT/CN2010/079747, mailed Mar. 24, 2011.

International Search Report issued in corresponding PCT Patent Application No. PCT/CN2010/079747, mailed Mar. 24, 2011.

Filed Chinese Patent Application No. 200910159150.6, 2009.

Filed European Patent Application No. 0911921 (corresponds to Chinese Patent Application No. 200910159150.6), 2009.

Office Action issued in corresponding Chinese Patent Application No. 201010516343.5, mailed Sep. 25, 2012.

\* cited by examiner

POWER FACTOR CORRECTION CONVERTER AND CONTROL METHOD THEREOF

CROSS-REFERENCE TO RELATED APPLICATIONS

This application claims priority to Chinese Patent Application No. 201010516343.5, filed on Oct. 22, 2010, and Chinese Patent Application No. 201010155655.8, filed on Apr. 22, 2010, both of which are hereby incorporated by reference in their entireties.

FIELD OF THE INVENTION

The present invention relates to the circuit field, and in particular, to a power factor correction converter, and a control method thereof.

BACKGROUND OF THE INVENTION

Energy saving and emission reduction is a trend in the process of globalization and in the communications field, power conversion efficiency is an important aspect. The high efficiency of a power supply relies on both improvement of a power device and application of a power supply topology.

In order to improve the power conversion efficiency, in the prior art, manufacturers in the industry derive various improved bridgeless Power Factor Correct (PFC) circuits from conventional bridgeless circuits. FIG. 1 shows a bridgeless PFC circuit in the prior art, in which, L01 and L02 are inductors for a Switching DC (Boost) circuit, S01 and S02 are main switch tubes for the PFC circuit, D01 and D02 are commutation diodes for a Boost power supply, D03 and D04 are freewheeling diodes, D05 and D06 do not join in normal work and only function in surge protection through the work mechanism as follows.

In a positive semicircle, S01 is turned on, such that the inductor L01 is charged through a power supply passing S01 and D04; and when a current reaches a set value, S01 is turned off, a power supply of L01 is reversed, and L01 is connected to the power supply in series, so as to charge an energy-storage capacitor through D01 and D04, and transfer energy to a subsequent converted power supply. When an inductive current of the power supply decreases to a set value, S01 is turned on again to charge the inductor L01 to store energy again, and a cycle is repeated in this manner. In the positive semicircle, S02, D02, D03, and L02 do not work.

In a negative semicircle, S02, D03, and L01 work symmetrically with S01, D04, and L02 respectively, and work principles are the same as those in the positive semicircle. In the negative semicircle, S01, D01, D04, and L01 do not work.

With respect to circuit loss, for example, in the positive semicircle, in the stage of turnon and energy storage, the current flows through three devices L01, S01, and D04 in series; and in the stage of cutting off energy transfer by the switch tube, the current flows through three devices L01, D01, and D04 in series.

However, in the prior art above, the diodes D01 and D02 used on bridge arm are silicon carbide diodes which are costly, leading to a high cost of the whole bridgeless PFC circuit.

Next, due to a high voltage drop of the silicon carbide diode, more energy is lost when the current flows through D01 or D02 in series, so the power conversion efficiency is lowered.

SUMMARY OF THE INVENTION

The present invention is directed to a power factor correction converter and a control method thereof, so as to reduce the cost, and improve the power conversion efficiency.

The power factor correction converter according to an embodiment of the present invention includes an interleaving control tube set, an alternating current power supply, a first inductor, a second inductor, a third inductor, a capacitor, a first bridge arm, and a second bridge arm. The first bridge arm includes a first switch tube and a second switch tube connected in series; the second bridge arm includes a third switch tube and a fourth switch tube connected in series; the interleaving control tube set, the first bridge arm, the second bridge arm, and the capacitor are connected to each other in parallel; the alternating current power supply and the first inductor are connected in series, and the second inductor and the third inductor are connected in parallel, and then connected to the first inductor in series; the second inductor is connected to the first bridge arm, and the third inductor is connected to the second bridge arm; and the alternating current power supply and the first inductor are connected in series, and then connected to the interleaving control tube set.

A power supply according to an embodiment of the present invention includes the power factor correction converter.

The control method of the power factor correction converter according to an embodiment of the present invention includes: closing a second switch tube and a third switch tube, and opening a first switch tube and a fourth switch tube, so as to charge a first inductor and a second inductor, and discharge a third inductor; closing the first switch tube and the third switch tube, and opening the second switch tube and the fourth switch tube, so as to discharge the first inductor, the second inductor, and the third inductor; closing the first switch tube and the fourth switch tube, and opening the second switch tube and the third switch tube, so as to discharge the second inductor, and charge the first inductor and the third inductor; and closing the first switch tube and the third switch tube, and opening the second switch tube and the fourth switch tube, so as to discharge the first inductor, the second inductor, and the third inductor.

The control method of the power factor correction converter according to an embodiment of the present invention includes: closing a second switch tube and a third switch tube, and opening a first switch tube and a fourth switch tube, so as to charge a first inductor and a second inductor, and discharge a third inductor; closing the second switch tube and the fourth switch tube, and opening the first switch tube and the third switch tube, so as to charge the first inductor, the second inductor, and the third inductor; closing the first switch tube and the fourth switch tube, and opening the second switch tube and the third switch tube, so as to discharge the second inductor, and charge the first inductor and the third inductor; and closing the second switch tube and the fourth switch tube, and opening the first switch tube and the third switch tube, so as to charge the first inductor, the second inductor, and the third inductor.

The control method of the power factor correction converter according to an embodiment of the present invention includes closing a first switch tube and a fourth switch tube, and opening a second switch tube and a third switch tube, so as to charge a third inductor, and discharge a first inductor and a second inductor; closing the second switch tube and the fourth switch tube, and opening the first switch tube and the third switch tube, so as to charge the first inductor, the second inductor, and the third inductor; closing the second switch tube and the third switch tube, and opening the first switch tube and the fourth switch tube, so as to charge the second inductor, and discharge the first inductor and the third inductor; and closing the second switch tube and the fourth switch tube, and opening the first switch tube and the third switch tube, so as to charge the first inductor, the second inductor, and the third inductor.

The control method of the power factor correction converter according to an embodiment of the present invention includes closing a first switch tube and a fourth switch tube, and opening a second switch tube and a third switch tube, so as to discharge a first inductor and a second inductor, and charge a third inductor; closing the first switch tube and the third switch tube, and opening the second switch tube and the fourth switch tube, so as to discharge the first inductor, the second inductor, and the third inductor; closing the second switch tube and the third switch tube, and opening the first switch tube and the fourth switch tube, so as to charge the second inductor, and discharge the first inductor and the third inductor; and closing the first switch tube and the third switch tube, and opening the second switch tube and the fourth switch tube, so as to discharge the first inductor, the second inductor, and the third inductor.

It can be seen from the above technical solution that the present invention has the following advantages.

In the present invention, on both the first bridge arm and the second bridge arm, two switch tubes connected in series instead of silicon carbide diodes are used as switches, and as the cost of the switch tube is far less than that of the silicon carbide diode, the cost can be effectively lowered.

Secondly, as a voltage drop of the switch tube is far less than that of the silicon carbide diode, the power consumption can be reduced in serial connection of current, so the power conversion efficiency is improved.

Further, as a common inductor of the two sets of BOOST conversion circuits, the first inductor L1 has the function of balancing the two sets of BOOST conversion circuits automatically, so that the interleave controlling of the two sets of BOOST conversion circuits is easier, the complexity of controlling the two sets of BOOST conversion circuits to turn on in an interleave mode by DSP (Digital Signal Processing) is decreased.

DETAILED DESCRIPTION OF THE EMBODIMENTS

In an embodiment, the present invention provides a power factor correction converter and a control method thereof, so as to decrease the cost, and improve the power conversion efficiency. Herein, the term "switch tube" should be understood as describing any device performing a switch function equivalent to a controllable single pole single throw (SPST) switch.

Figure 1:
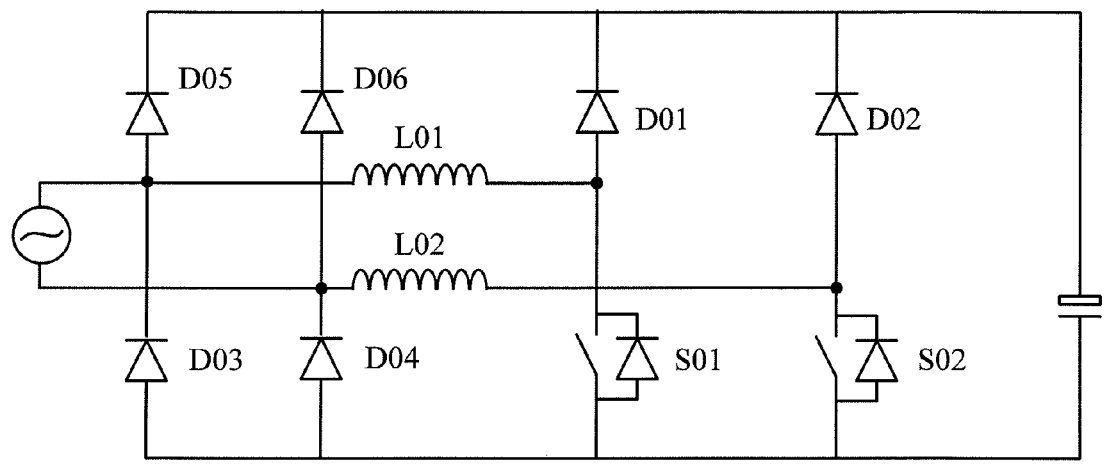
FIG. 1 is a schematic view of a PFC converter in the prior art.
Figure 2:
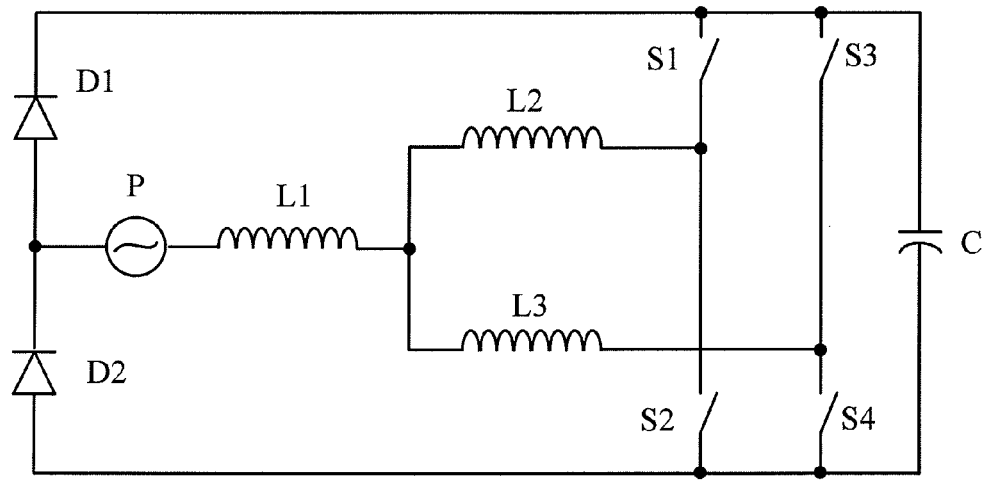
FIG. 2 is a schematic view of a PFC converter according to an embodiment of the present invention.

Referring to FIG. 2, a PFC converter according to an embodiment of the present invention includes:

an interleaving control tube set, an alternating current power supply P, a first inductor L1, a second inductor L2, a third inductor L3, a capacitor C, a first bridge arm, and a second bridge arm.

The first bridge arm includes a first switch tube S1 and a second switch tube S2 connected in series.

The second bridge arm includes a third switch tube S3 and a fourth switch tube S4 connected in series.

The interleaving control tube set, the first bridge arm, the second bridge arm, and the capacitor C are connected to each other in parallel.

The alternating current power supply P and the first inductor L1 are connected in series, and the second inductor L2 and the third inductor L3 are connected in parallel, and then connected to the first inductor L1 in series.

The second inductor L2 is connected to the first bridge arm, and the third inductor L3 is connected to the second bridge arm.

The interleaving control tube set is connected to the alternating current power supply P, and the first inductor L1 is connected to the second inductor L2 and the third inductor L3.

It should be noted that the interleaving control tube set in this embodiment may include two diodes or switch tubes connected in series, and description is made taking diodes D1 and D2 as examples in this embodiment.

In this embodiment, the first inductor L1, the second inductor L2, and the third inductor L3 may be single inductors, or coupled inductors.

In this embodiment, in practical applications, the first switch tube S1, the second switch tube S2, the third switch tube S3, and the fourth switch tube S4 may be Metal Oxide Semiconductor Field Effect Transistor (Mosfet) switch tubes, Insulated Gate Bipolar Transistor (IGBT) switch tubes, or other types of switch tubes.

In this embodiment, the capacitor C may be, but is not specifically limited to, a separate capacitor device, or a module or circuit capable of achieving the capacitor function.

According to the embodiment, on both the first bridge arm and the second bridge arm, two switch tubes connected in series instead of silicon carbide diodes are used as switches, and as the cost of the switch tube is far less than that of the silicon carbide diode, the cost can be effectively lowered.

Secondly, as a voltage drop of the switch tube is far less than that of the silicon carbide diode, the loss of power can be reduced in serial connection of a current, thereby the power conversion efficiency is improved.

Further, the interleaving control tube set, the first inductor L1, the second inductor L2, and the first bridge arm constitute a set of BOOST conversion circuits; the interleaving control tube set, the first inductor L1, the third inductor L3 and the second bridge arm constitute another set of BOOST conversion circuits. The two sets of BOOST circuits may be turned on in an interleave mode regardless of the phase difference between the two sets of BOOST conversion circuits. For example, the phase difference between the two sets of BOOST conversion circuits is 180 degree, and the two outputs of the two sets of BOOST conversion circuits to a subsequent circuit are overlapped, so that the waveform of the two outputs of the two sets of BOOST conversion circuits are offset by each other, and the output voltage is more smooth. As a common inductor of the two sets of BOOST conversion circuits, the first inductor L1 has the function of balancing the two sets of BOOST conversion circuits automatically, so that the interleave controlling of the two sets of BOOST conversion circuits is easier, and the complexity of controlling of the two sets of BOOST conversion circuits to turn on in the interleave mode by DSP (Digital Signal Processing) is decreased.

Figure 3:
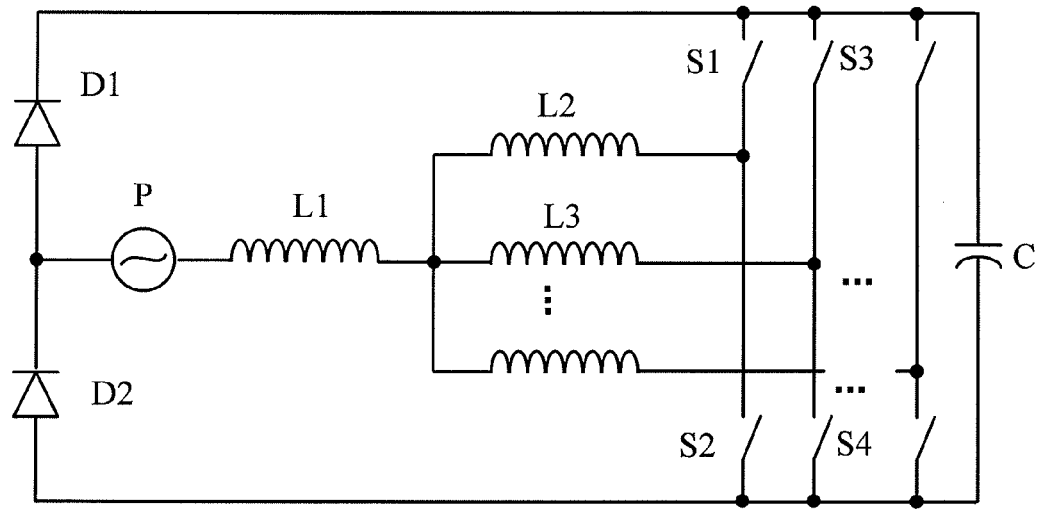
FIG. 3 is a schematic view of another PFC converter according to an embodiment of the present invention.

Hereinafter, another PFC converter according to an embodiment of the present invention is described. FIG. 3 describes another PFC converter according to the embodiment of the present invention. As compared with the PFC converter as shown in FIG. 2, in the PFC converter as shown in FIG. 3, more bridge arms and inductors can be added, and a specific number is not limited herein. Each bridge arm is connected to the first bridge arm and the second bridge arm in parallel, and includes two switch tubes connected in series; and each inductor is connected to the second inductor L2 and the third inductor L3 in parallel, and connected to a corresponding bridge arm.

In this embodiment, more bridge arms and inductors may be added, such that the output of a current from a circuit inductor to a subsequent circuit is more continuous, the ripple is smaller, and higher power conversion efficiency can be achieved.

Figure 4:
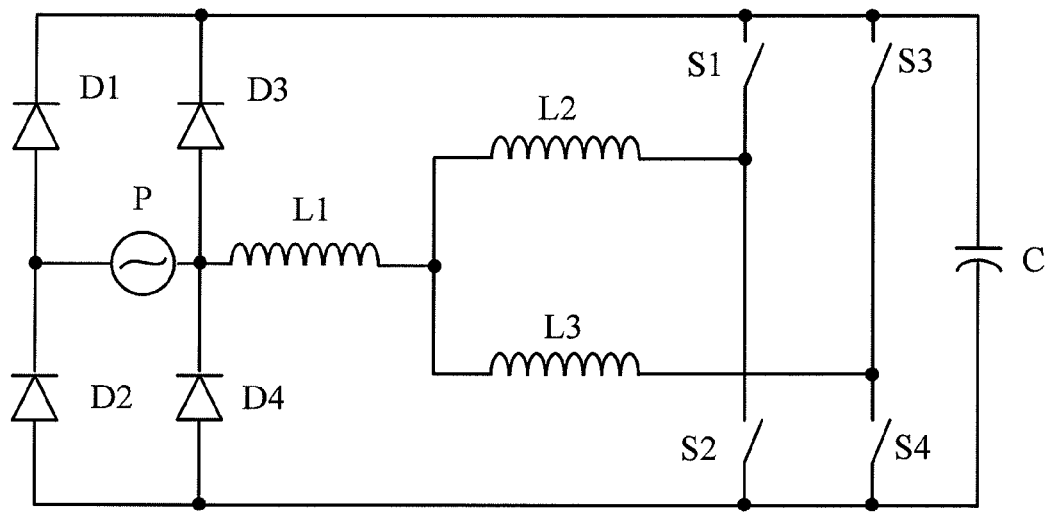
FIG. 4 is a schematic view of another PFC converter according to an embodiment of the present invention.

Hereinafter, another PFC converter according to an embodiment of the present invention is described. FIG. 4 describes another PFC converter according to the embodiment of the present invention. As compared with the PFC converter as shown in FIG. 2, in the PFC converter as shown in FIG. 4, a protection tube set is added, which is located between the alternating current power supply P and the first inductor L1, and the protection tube set is connected to the interleaving control tube set, the first bridge arm, the second bridge arm, and the capacitor C in parallel.

In this embodiment, the protection tube set may include two diodes or switch tubes connected in series, and description is made taking diodes D3 and D4 as examples in this embodiment.

The diodes D3 and D4 are used as transient protection diodes, which do not work at normal time, and clamp the transient voltage and current together with the diodes D1 and D2 and the capacitor C when there is a transient.

It should be noted that the solution of adding the protection tube set in this embodiment is also applicable in the solution having more bridge arms and inductors as shown in FIG. 3.

In this embodiment, the capacitor C may be, but is not specifically limited to, a separate capacitor device, or a module or circuit capable of achieving the capacitor function.

In this embodiment, the protection tube set may be added, such that the diodes D3, D4, D1, and D2, and the capacitor C can clamp the transient voltage and current together when there is lightning, thereby efficiently avoiding a transient surge.

Figure 5:
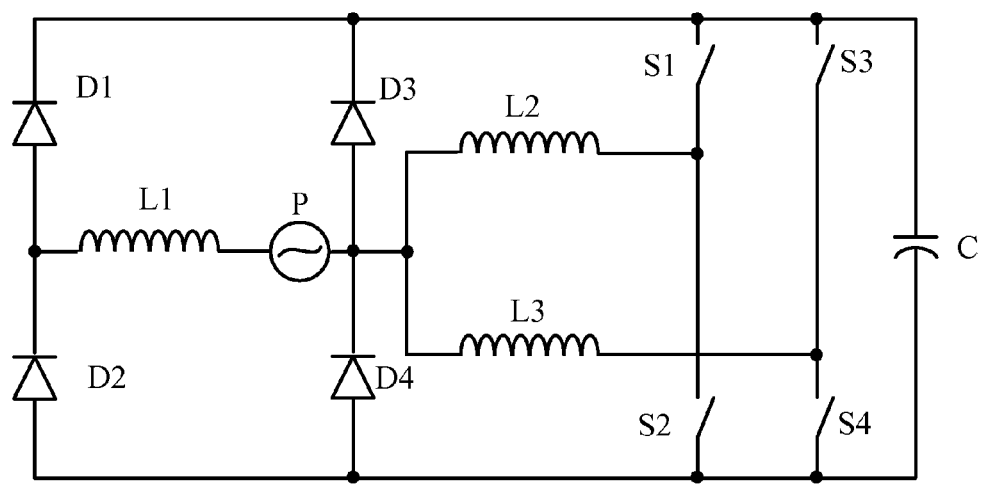
FIG. 5 is a schematic view of another PFC converter according to an embodiment of the present invention.

Hereinafter, another PFC converter according to an embodiment of the present invention is described. FIG. 5 describes another PFC converter according to the embodiment of the present invention. As compared with the PFC converter as shown in FIG. 2, in the PFC converter as shown in FIG. 5, positions of the alternating current power supply P and the first inductor L1 are exchanged, that is, the interleaving control tube set is connected to the first inductor L1, and the alternating current power supply P is connected to the second inductor L2 and the third inductor L3, and a protection tube set may be further added.

Likewise, the protection tube set according to this embodiment may include two diodes or switch tubes connected in series, and description is made taking diodes D3 and D4 as examples in this embodiment.

The diodes D3 and D4 are used as transient protection diodes which do not work at normal time, and clamp the transient voltage and current together with the diodes D1 and D2 and the capacitor C when there is la transient.

It should be noted that the solution of adding the protection tube set and exchanging the positions of the first inductor L1 and the alternating current power supply P in this embodiment is also applicable in the solution having more bridge arms and inductors as shown in FIG. 3.

In this embodiment, the capacitor C may be, but is not specifically limited to, a separate capacitor device, or a module or circuit capable of achieving the capacitor function.

In this embodiment, the protection tube set may be added, such that the diodes D3, D4, D1, and D2, and the capacitor C can clamp the transient voltage and current together when there is lightning, so the transient surge can be efficiently prevented.

Hereinafter, a control method of a PFC converter according to an embodiment of the present invention is described, which is applied to the PFC converters as shown in FIGS. 2 to 5 above, and description is made taking the PFC converter as shown in FIG. 2 as an example.

In a work process of a PFC converter, there are two scenarios, where a power supply network is in a positive semicircle or a negative semicircle. When the power supply network is in the positive semicircle, there are two modes which respectively have a duty circle greater than 50% or less than 50%. Likewise, when the power supply network is in the negative semicircle, there are also two modes which respectively have a duty circle greater than 50% or less than 50%.

It should be noted that as for a case in which the power supply network is in the positive semicircle or the negative semicircle, when the duty circle is equal to 50%, either the mode having a duty circle greater than 50% or the mode having a duty circle less than 50% may be used, and it is not limited herein.

The cases above are respectively described below.

I. The mode in which the power supply network is in the positive semicircle, and the duty circle is less than 50%

In this mode, a second switch tube S2 and a fourth switch tube S4 are main tubes, and a specific process may include:

(1) closing the second switch tube and a third switch tube, and opening a first switch tube and the fourth switch tube to charge a first inductor and a second inductor and discharge a third inductor;

where the second switch tube S2 and the third switch tube S3 are closed, and the first switch tube S1 and the fourth switch tube S4 are opened, such that the first inductor L1 and the second inductor L2 are charged through the energy of an input power supply passing a loop formed of the first inductor L1, the second inductor L2, the second switch tube S2, and a diode D2, and thereby currents in the first inductor L1 and the second inductor L2 are increased; and the energy stored in the first inductor L1 and the third inductor L3 also is transferred to the output capacitor C by passing through a loop formed of the first inductor L1, the third inductor L3, the third switch tube S3, a capacitor C, and the diode D2, and thus a current in the third inductor L3 is decreased;

(2) closing the first switch tube and the third switch tube, and opening the second switch tube and the fourth switch tube, so as to discharge the first inductor, the second inductor, and the third inductor;

where the first switch tube S1 and the third switch tube S3 are closed, and the second switch tube S2 and fourth switch tube S4 are opened, such that the energy stored in the first inductor L1 and the second inductor L2 is transferred to the output capacitor C by also passing through a loop formed of the first inductor L1, the second inductor L2, the first switch tube S1, the capacitor C, and the diode D2, and thus the currents in the first inductor L1 and the second inductor L2 are decreased; and the energy stored in the first inductor L1 and the third inductor L3 is transferred to the output capacitor C by also passing through the loop formed of the first inductor L1, the third inductor L3, the third switch tube S3, the capacitor C, and the diode D2, thereby the currents in the first inductor L1 and the third inductor L3 are decreased;

(3) closing the first switch tube and the fourth switch tube, and opening the second switch tube and the third switch tube, so as to discharge the second inductor, and charge the first inductor and the third inductor;

where the first switch tube S1 and the fourth switch tube S4 are closed, and the second switch tube S2 and the third switch tube S3 are opened, such that the energy stored in the first inductor L1 and the second inductor L2 is transferred to the output capacitor C by also passing through the loop formed of the first inductor L1, the second inductor L2, the first switch tube S1, the capacitor C, and the diode D2, and thereby the current in the second inductor L2 is decreased; and the first inductor L1 and the third inductor L3 are charged through the energy of the input power supply passing a loop formed of the first inductor L1, the third inductor L3, the fourth switch tube. S4, and the diode D2, and thereby the current in the first inductor L1 and the third inductor L3 are increased; and (4) closing the first switch tube and the third switch tube, and opening the second switch tube and the fourth switch tube, so as to discharge the first inductor, the second inductor, and the third inductor;

where the first switch tube S1 and the third switch tube S3 are closed, and the second switch tube S2 and the fourth switch tube S4 are opened, such that the energy stored in the first inductor L1 and the second inductor L2 also is transferred to the output capacitor C by passing through the loop formed of the first inductor L1, the second inductor L2, the first switch tube S1, the capacitor C, and the diode D2, and thereby the currents in the first inductor L1 and the second inductor L2 are decreased; and the energy stored in the first inductor L1 and the third inductor L3 is transferred to the output capacitor C by also passing through the loop formed of the first inductor L1, the third inductor L3, the third switch tube S3, the capacitor C, and the diode D2, and thereby the currents in the first inductor L1 and the third inductor L3 are decreased.

Then the above Steps (1) to (4) are repeated again.

II. The mode in which the power supply network is in the positive semicircle, and the duty circle is greater than 50%

In this mode, the second switch tube S2 and the fourth switch tube S4 are main tubes, and a specific process may include:

(1) closing the second switch tube and the third switch tube, and opening the first switch tube and the fourth switch tube, so as to charge the first inductor and the second inductor, and discharge the third inductor;

where the second switch tube S2 and the third switch tube S3 are closed, and the first switch tube S1 and the fourth switch tube S4 are opened, such that the first inductor L1 and the second inductor L2 are charged through the energy of the input power supply passing the loop formed of the first inductor L1, the second inductor L2, the second switch tube S2, and the diode D2, and thereby the currents in the first inductor L1 and the second inductor L2 are increased; and the energy stored in the first inductor L1 and the third inductor L3 is transferred to the output capacitor C by also passing through the loop formed of the first inductor L1, the third inductor L3, the third switch tube S3, the capacitor C, and the diode D2, and thereby the current in the third inductor L3 is decreased;

(2) closing the second switch tube and the fourth switch tube, and opening the first switch tube and the third switch tube, so as to charge the first inductor, the second inductor, and the third inductor;

where the second switch tube S2 and the fourth switch tube S4 are closed, and the first switch tube S1 and the third switch tube S3 are opened, such that the first inductor L1 and the second inductor L2 are charged through the energy of the input power supply passing the loop formed of the first inductor L1, the second inductor L2, the second switch tube S2, and the diode D2, and thereby the currents in the first inductor L1 and the second inductor L2 are increased; and the first inductor L1 and the third inductor L3 are charged by also passing the energy of the input power supply through the loop formed of the first inductor L1, the third inductor L3, the fourth switch tube S4, and the diode D2, thereby the currents in the first inductor L1 and the third inductor L3 are increased;

(3) closing the first switch tube and the fourth switch tube, and opening the second switch tube and the third switch tube, so as to discharge the second inductor, and charge the first inductor and the third inductor;

where, the first switch tube S1 and the fourth switch tube S4 are closed, and the second switch tube S2 and the third switch tube S3 are opened, such that the energy stored in the first inductor L1 and the second inductor L2 is transferred to the output capacitor C by also passing through the loop formed of the first inductor L1, the second inductor L2, the first switch tube S1, the capacitor C, and the diode D2, and thereby the current in the second inductor L2 is decreased; and the first inductor L1 and the third inductor L3 are charged through the energy of the input power supply passing the loop formed of the first inductor L1, the third inductor L3, the fourth switch tube S4, and the diode D2, and thereby the currents in the first inductor L1 and the third inductor L3 are increased; and (4) closing the second switch tube and the fourth switch tube, and opening the first switch tube and the third switch tube, so as to charge the first inductor, the second inductor, and the third inductor;

where, the second switch tube S2 and the fourth switch tube S4 are closed, and the first switch tube S1 and the third switch tube S3 are opened, such that the first inductor L1 and the second inductor L2 are charged through the energy of the input power supply passing the loop formed of the first inductor L1, the second inductor L2, the second switch tube S2, and the diode D2, and thereby the currents in the first inductor L1 and the second inductor L2 are increased; and the first inductor L1 and the third inductor L3 are charged through the energy of the input power supply passing the loop formed of the first inductor L1, the third inductor L3, the fourth switch tube S4, and the diode D2, and thereby the currents in the first inductor L1 and the third inductor L3 are increased.

Then, the above Steps (1) to (4) are performed again.

III. The mode in which the power supply network is in the negative semicircle, and the duty circle is less than 50%

In this mode, the first switch tube S1 and the third switch tube S3 are main tubes, and a specific process may include:

(1) closing the first switch tube and the fourth switch tube, and opening the second switch tube and the third switch tube, so as to discharge the third inductor, and charge the first inductor and the second inductor;

(2) closing the second switch tube and the fourth switch tube, and opening the first switch tube and the third switch tube, so as to discharge the first inductor, the second inductor, and the third inductor;

(3) closing the second switch tube and the third switch tube, and opening the first switch tube and the fourth switch tube, so as to discharge the second inductor and charge the first inductor and the third inductor; and (4) closing the second switch tube and the fourth switch tube, and opening the first switch tube and the third switch tube, so as to discharge the first inductor, the second inductor, and the third inductor.

Then, the above Steps (1) to (4) are performed again.

In this mode, the specific work process of a circuit is substantially similar to that of a circuit in the mode above in which "the power supply network is in the positive semicircle, and the duty circle is less than 50%", except that the first switch tube S1 and the second switch tube S2 in "the mode in which the power supply network is in the positive semicircle, and the duty circle is less than 50%" are exchanged, the third switch tube S3 and the fourth switch tube S4 are exchanged, the diode D2 is replaced by the diode D1, and the currents in the first inductor L1, the second inductor L2, and the third inductor L3 are reversed.

IV. The mode in which the power supply network is in the negative semicircle, and the duty circle is greater than 50%

In this mode, the first switch tube S1 and the third switch tube S3 are main tubes, and a specific process may include:

(1) closing the first switch tube and the fourth switch tube, and opening the second switch tube and the third switch tube, so as to charge the first inductor and the second inductor, and discharge the third inductor;

(2) closing the first switch tube and the third switch tube, and opening the second switch tube and the fourth switch tube, so as to charge the first inductor, the second inductor, and the third inductor;

(3) closing the second switch tube and the third switch tube, and opening the first switch tube and the fourth switch tube, so as to discharge the second inductor, and charge the first inductor and the third inductor; and (4) closing the first switch tube and the third switch tube, and opening the second switch tube and the fourth switch tube, so as to charge the first inductor, the second inductor, and the third inductor.

Then, the above Steps (1) to (4) are performed again.

In this mode, the specific work process of a circuit is substantially similar to that of a circuit in the mode above in which "the power supply network is in the positive semicircle, and the duty circle is greater than 50%", except that the first switch tube S1 and the second switch tube S2 in "the mode in which the power supply network is in the positive semicircle, and the duty circle is greater than 50%" are exchanged, the third switch tube S3 and the fourth switch tube S4 are exchanged, the diode D2 is replaced by the diode D1, and the currents in the first inductor L1, the second inductor L2, and the third inductor L3 are reversed.

In this embodiment, in practical application, the first switch tube S1, the second switch tube S2, the third switch tube S3, and the fourth switch tube S4 may be Mosfet switch tubes, IGBT switch tubes, or other types of switch tubes.

According to the above control process of the PFC converter, the conversion of the power energy can be achieved, thereby decreasing the cost, and improve the power conversion efficiency.

Figure 6:
FIG. 6 is a schematic view of a power supply according to an embodiment of the present invention.

An embodiment of the present invention further provides a power supply that uses the PFC converter according to an embodiment of the present invention and the power supply converts an alternating current to a direct current. FIG. 6 shows the structure of the power supply, including the PFC converter according to the embodiment of the present invention, a resonant converter, such as a LCC resonant converter, and a rectifier circuit.

Persons of ordinary skill in the art should understand that all or a part of the steps of the method according to the embodiments of the present invention may be implemented by a computer program product instructing relevant hardware. The computer program product may be stored in a computer readable storage medium, such as a Read Only Memory (ROM), a magnetic disk, or an optical disk.

The power factor correction converter and the control method thereof according to the present invention are described in detail above. Persons of ordinary skill in the art can make changes to the present invention in terms of the specific implementations and application scopes according to the ideas of the present invention. Therefore, the specification shall not be construed as limiting the present invention.

What is claimed is:

1. A power factor correction converter, comprising:
   an interleaving control tube set, connectable to an alternating current power supply, a first inductor, a second inductor, a third inductor, a capacitor, a first bridge arm, and a second bridge arm, wherein
   the first bridge arm comprises a first switch tube and a second switch tube connected in series;
   the second bridge arm comprises a third switch tube and a fourth switch tube connected in series;
   the interleaving control tube set, the first bridge arm, the second bridge arm, and the capacitor are connected to each other in parallel;
   the alternating current power supply and the first inductor are connected in series, and the second inductor and the third inductor are connected in parallel, and then connected to the first inductor in series;
   the second inductor is connected to the first bridge arm, and the third inductor is connected to the second bridge arm; and
   the alternating current power supply and the first inductor are connected in series, and then connected to the interleaving control tube set.

2. The power factor correction converter according to claim 1, wherein
   the interleaving control tube set is connected to the alternating current power supply, and the first inductor is connected to the second inductor and the third inductor.

3. The power factor correction converter according to claim 1, wherein
   the interleaving control tube set is connected to the first inductor, and the alternating current power supply is connected to the second inductor and the third inductor.

4. The power factor correction converter according to claim 1, wherein:
   the interleaving control tube set comprises two diodes or switch tubes connected in series.

5. The power factor correction converter according to claim 1, wherein
   the power factor correction converter further comprises a preset number of bridge arms, and each bridge arm is connected to the first bridge arm and the second bridge arm in parallel and comprises two switch tubes connected in series; and
   the power factor correction converter further comprises a preset number of inductors, and each inductor is connected to the second inductor and the third inductor in parallel and connected to a corresponding bridge arm.

6. The power factor correction converter according to claim 2, wherein
   the power factor correction converter further comprises a protection tube set; and the protection tube set is located between the alternating current power supply and the first inductor, and connected to the interleaving control tube set, the first bridge arm, the second bridge arm, and the capacitor in parallel.

7. The power factor correction converter according to claim 3, wherein
the power factor correction converter further comprises a protection tube set; and
the protection tube set is located between the alternating current power supply and the two inductors including the second inductor and the third inductor, and connected to the interleaving control tube set, the first bridge arm, the second bridge arm, and the capacitor in parallel.

8. The power factor correction converter according to claim 6, wherein
the protection tube set comprises two diodes or switch tubes connected in series.

9. The power factor correction converter according to claim 7, wherein
the protection tube set comprises two diodes or switch tubes connected in series.

10. The power factor correction converter according to claim 1, wherein:
the first inductor, the second inductor, and the third inductor are single inductors, or coupled inductors.

11. The power factor correction converter according to claim 1, wherein:
the switch tubes are Metal Oxide Semiconductor Field Effect Transistor (Mosfet) switch tubes, or Insulated Gate Bipolar Transistor (IGBT) switch tubes.

12. A power supply, comprising:
a power factor correction converter;
a resonant converter; and
a rectifier circuit;
wherein the power factor correction converter, comprises:
an interleaving control tube set, connectable to an alternating current power supply, a first inductor, a second inductor, a third inductor, a capacitor, a first bridge arm, and a second bridge arm, wherein
the first bridge arm comprises a first switch tube and a second switch tube connected in series;
the second bridge arm comprises a third switch tube and a fourth switch tube connected in series;
the interleaving control tube set, the first bridge arm, the second bridge arm, and the capacitor are connected to each other in parallel;
the alternating current power supply and the first inductor are connected in series, and the second inductor and the third inductor are connected in parallel, and then connected to the first inductor in series;
the second inductor is connected to the first bridge arm, and the third inductor is connected to the second bridge arm; and
the alternating current power supply and the first inductor are connected in series, and then connected to the interleaving control tube set.

13. A control method of a power factor correction converter, applicable for the power factor correction converter having:
an interleaving control tube set, connectable to an alternating current power supply, a first inductor, a second inductor, a third inductor, a capacitor, a first bridge arm, and a second bridge arm, wherein
the first bridge arm comprises a first switch tube and a second switch tube connected in series;
the second bridge arm comprises a third switch tube and a fourth switch tube connected in series;
the interleaving control tube set, the first bridge arm, the second bridge arm, and the capacitor are connected to each other in parallel;
the alternating current power supply and the first inductor are connected in series, and the second inductor and the third inductor are connected in parallel, and then connected to the first inductor in series;
the second inductor is connected to the first bridge arm, and the third inductor is connected to the second bridge arm; and
the alternating current power supply and the first inductor are connected in series, and then connected to the interleaving control tube set;
the method comprising:
closing a second switch tube and a third switch tube, and opening a first switch tube and a fourth switch tube, so as to charge a first inductor and a second inductor, and discharge a third inductor;
closing the first switch tube and the third switch tube, and opening the second switch tube and the fourth switch tube, so as to discharge the first inductor, the second inductor, and the third inductor;
closing the first switch tube and the fourth switch tube, and opening the second switch tube and the third switch tube, so as to discharge the second inductor, and charge the first inductor and the third inductor; and
closing the first switch tube and the third switch tube, and opening the second switch tube and the fourth switch tube, so as to discharge the first inductor, the second inductor, and the third inductor.

14. A control method of a power factor correction converter, applicable for the power factor correction converter having:
an interleaving control tube set, connectable to an alternating current power supply, a first inductor, a second inductor, a third inductor, a capacitor, a first bridge arm, and a second bridge arm, wherein
the first bridge arm comprises a first switch tube and a second switch tube connected in series;
the second bridge arm comprises a third switch tube and a fourth switch tube connected in series;
the interleaving control tube set, the first bridge arm, the second bridge arm, and the capacitor are connected to each other in parallel;
the alternating current power supply and the first inductor are connected in series, and the second inductor and the third inductor are connected in parallel, and then connected to the first inductor in series;
the second inductor is connected to the first bridge arm, and the third inductor is connected to the second bridge arm; and
the alternating current power supply and the first inductor are connected in series, and then connected to the interleaving control tube set;
the method comprising:
closing a second switch tube and a third switch tube, and opening a first switch tube and a fourth switch tube, so as to charge a first inductor and a second inductor, and discharge a third inductor;
closing the second switch tube and the fourth switch tube, and opening the first switch tube and the third switch tube, so as to charge the first inductor, the second inductor, and the third inductor;
closing the first switch tube and the fourth switch tube, and opening the second switch tube and the third switch tube, so as to discharge the second inductor, and charge the first inductor and the third inductor; and closing the second switch tube and the fourth switch tube, and opening the first switch tube and the third switch tube, so as to charge the first inductor, the second inductor, and the third inductor.

15. A control method of a power factor correction converter, applicable for the power factor correction converter having:

an interleaving control tube set, connectable to an alternating current power supply, a first inductor, a second inductor, a third inductor, a capacitor, a first bridge arm, and a second bridge arm, wherein the first bridge arm comprises a first switch tube and a second switch tube connected in series;

the second bridge arm comprises a third switch tube and a fourth switch tube connected in series;

the interleaving control tube set, the first bridge arm, the second bridge arm, and the capacitor are connected to each other in parallel;

the alternating current power supply and the first inductor are connected in series, and the second inductor and the third inductor are connected in parallel, and then connected to the first inductor in series;

the second inductor is connected to the first bridge arm, and the third inductor is connected to the second bridge arm; and the alternating current power supply and the first inductor are connected in series, and then connected to the interleaving control tube set;

the method comprising:

closing a first switch tube and a fourth switch tube, and opening a second switch tube and a third switch tube, so as to discharge a third inductor, and charge a first inductor and a second inductor;

closing the second switch tube and the fourth switch tube, and opening the first switch tube and the third switch tube, so as to discharge the first inductor, the second inductor, and the third inductor;

closing the second switch tube and the third switch tube, and opening the first switch tube and the fourth switch tube, so as to discharge the second inductor, and charge the first inductor and the third inductor; and closing the second switch tube and the fourth switch tube, and opening the first switch tube and the third switch tube, so as to discharge the first inductor, the second inductor, and the third inductor.

16. A control method of a power factor correction converter, applicable for the power factor correction converter having:

an interleaving control tube set, connectable to an alternating current power supply, a first inductor, a second inductor, a third inductor, a capacitor, a first bridge arm, and a second bridge arm, wherein the first bridge arm comprises a first switch tube and a second switch tube connected in series;

the second bridge arm comprises a third switch tube and a fourth switch tube connected in series;

the interleaving control tube set, the first bridge arm, the second bridge arm, and the capacitor are connected to each other in parallel;

the alternating current power supply and the first inductor are connected in series, and the second inductor and the third inductor are connected in parallel, and then connected to the first inductor in series;

the second inductor is connected to the first bridge arm, and the third inductor is connected to the second bridge arm; and the alternating current power supply and the first inductor are connected in series, and then connected to the interleaving control tube set;

the method comprising:

closing a first switch tube and a fourth switch tube, and opening a second switch tube and a third switch tube, so as to charge a first inductor and a second inductor, and discharge a third inductor;

closing the first switch tube and the third switch tube, and opening the second switch tube and the fourth switch tube, so as to charge the first inductor, the second inductor, and the third inductor;

closing the second switch tube and the third switch tube, and opening the first switch tube and the fourth switch tube, so as to discharge the second inductor, and charge the first inductor and the third inductor; and closing the first switch tube and the third switch tube, and opening the second switch tube and the fourth switch tube, so as to charge the first inductor, the second inductor, and the third inductor.

17. A non-transitory computer readable storage medium comprising a computer program product, wherein the computer program product instructs relevant hardware in a power factor converter to implement the following:

closing a second switch tube and a third switch tube, and opening a first switch tube and a fourth switch tube, so as to charge a first inductor and a second inductor, and discharge a third inductor;

closing the first switch tube and the third switch tube, and opening the second switch tube and the fourth switch tube, so as to discharge the first inductor, the second inductor, and the third inductor;

closing the first switch tube and the fourth switch tube, and opening the second switch tube and the third switch tube, so as to discharge the second inductor, and charge the first inductor and the third inductor; and afterwards, closing the first switch tube and the third switch tube, and opening the second switch tube and the fourth switch tube, so as to discharge the first inductor, the second inductor, and the third inductor;

wherein the power factor converter comprises an interleaving control tube set, connectable to an alternating current power supply, the first inductor, the second inductor, the third inductor, a capacitor, a first bridge arm, and a second bridge arm, wherein the first bridge arm comprises the first switch tube and a second switch tube connected in series;

the second bridge arm comprises a third switch tube and a fourth switch tube connected in series;

the interleaving control tube set, the first bridge arm, the second bridge arm, and the capacitor are connected to each other in parallel;

the alternating current power supply and the first inductor are connected in series, and the second inductor and the third inductor are connected in parallel, and then connected to the first inductor in series;

the second inductor is connected to the first bridge arm, and the third inductor is connected to the second bridge arm; and the alternating current power supply and the first inductor are connected in series, and then connected to the interleaving control tube set.

18. A non-transitory computer readable storage medium comprising a computer program product, wherein the computer program product instructs relevant hardware in a power factor converter to implement the following:

closing a second switch tube and a third switch tube, and opening a first switch tube and a fourth switch tube, so as to charge a first inductor and a second inductor, and discharge a third inductor;

closing the second switch tube and the fourth switch tube, and opening the first switch tube and the third switch tube, so as to charge the first inductor, the second inductor, and the third inductor;

closing the first switch tube and the fourth switch tube, and opening the second switch tube and the third switch tube, so as to discharge the second inductor, and charge the first inductor and the third inductor; and afterwards, closing the second switch tube and the fourth switch tube, and opening the first switch tube and the third switch tube, so as to charge the first inductor, the second inductor, and the third inductor;

wherein the power factor converter comprises an interleaving control tube set, connectable to an alternating current power supply, the first inductor, the second inductor, the third inductor, a capacitor, a first bridge arm, and a second bridge arm, wherein the first bridge arm comprises the first switch tube and a second switch tube connected in series;

the second bridge arm comprises a third switch tube and a fourth switch tube connected in series;

the interleaving control tube set, the first bridge arm, the second bridge arm, and the capacitor are connected to each other in parallel;

the alternating current power supply and the first inductor are connected in series, and the second inductor and the third inductor are connected in parallel, and then connected to the first inductor in series;

the second inductor is connected to the first bridge arm, and the third inductor is connected to the second bridge arm; and the alternating current power supply and the first inductor are connected in series, and then connected to the interleaving control tube set.

19. A non-transitory computer readable storage medium comprising a computer program product, wherein the computer program product instructs relevant hardware in a power factor converter to implement the following:

closing a first switch tube and a fourth switch tube, and opening a second switch tube and a third switch tube, so as to discharge a third inductor, and charge a first inductor and a second inductor;

closing the second switch tube and the fourth switch tube, and opening the first switch tube and the third switch tube, so as to discharge the first inductor, the second inductor, and the third inductor;

closing the second switch tube and the third switch tube, and opening the first switch tube and the fourth switch tube, so as to discharge the second inductor, and charge the first inductor and the third inductor; and afterwards, closing the second switch tube and the fourth switch tube, and opening the first switch tube and the third switch tube, so as to discharge the first inductor, the second inductor, and the third inductor;

wherein the power factor converter comprises an interleaving control tube set, connectable to an alternating current power supply, the first inductor, the second inductor, the third inductor, a capacitor, a first bridge arm, and a second bridge arm, wherein the first bridge arm comprises the first switch tube and a second switch tube connected in series;

the second bridge arm comprises a third switch tube and a fourth switch tube connected in series;

the interleaving control tube set, the first bridge arm, the second bridge arm, and the capacitor are connected to each other in parallel;

the alternating current power supply and the first inductor are connected in series, and the second inductor and the third inductor are connected in parallel, and then connected to the first inductor in series;

the second inductor is connected to the first bridge arm, and the third inductor is connected to the second bridge arm; and the alternating current power supply and the first inductor are connected in series, and then connected to the interleaving control tube set.

20. A non-transitory computer readable storage medium comprising a computer program product, wherein the computer program product instructs relevant hardware in a power factor converter to implement the following:

closing a first switch tube and a fourth switch tube, and opening a second switch tube and a third switch tube, so as to charge a first inductor and a second inductor, and discharge a third inductor;

closing the first switch tube and the third switch tube, and opening the second switch tube and the fourth switch tube, so as to charge the first inductor, the second inductor, and the third inductor;

closing the second switch tube and the third switch tube, and opening the first switch tube and the fourth switch tube, so as to discharge the second inductor, and charge the first inductor and the third inductor; and afterwards, closing the first switch tube and the third switch tube, and opening the second switch tube and the fourth switch tube, so as to charge the first inductor, the second inductor, and the third inductor;

wherein the power factor converter comprises an interleaving control tube set, connectable to an alternating current power supply, the first inductor, the second inductor, the third inductor, a capacitor, a first bridge arm, and a second bridge arm, wherein the first bridge arm comprises the first switch tube and a second switch tube connected in series;

the second bridge arm comprises a third switch tube and a fourth switch tube connected in series;

the interleaving control tube set, the first bridge arm, the second bridge arm, and the capacitor are connected to each other in parallel;

the alternating current power supply and the first inductor are connected in series, and the second inductor and the third inductor are connected in parallel, and then connected to the first inductor in series;

the second inductor is connected to the first bridge arm, and the third inductor is connected to the second bridge arm; and the alternating current power supply and the first inductor are connected in series, and then connected to the interleaving control tube set.

* * * * *

UNITED STATES PATENT AND TRADEMARK OFFICE
CERTIFICATE OF CORRECTION

PATENT NO. : 8,432,138 B2
APPLICATION NO. : 12/967954
DATED : April 30, 2013
INVENTOR(S) : Wenbin Chen et al.

It is certified that error appears in the above-identified patent and that said Letters Patent is hereby corrected as shown below:

On the Title Page

Left column, item (75), replace "Weubin Chen" with --Wenbin Chen--.

Signed and Sealed this
Twenty-sixth Day of July, 2016

Michelle K. Lee
*Director of the United States Patent and Trademark Office*